United States Patent [19]

Cochran et al.

[11] Patent Number: 5,352,071
[45] Date of Patent: Oct. 4, 1994

[54] HOLE SAW ARBOR WITH RETAINING MECHANISM

[75] Inventors: Paul Cochran, Stillman Valley; Thomas J. Pearson, Rockford, both of Ill.

[73] Assignee: Greenlee Textron Inc., Rockford, Ill.

[21] Appl. No.: 73,580

[22] Filed: Jun. 7, 1993

[51] Int. Cl.$^5$ .............................................. B23B 51/04
[52] U.S. Cl. ......................... 408/204; 408/703
[58] Field of Search .................. 408/204, 207, 703; 144/21, 20, 23

[56] References Cited

U.S. PATENT DOCUMENTS

| 3,758,221 | 9/1973 | Meshulam . | |
|---|---|---|---|
| 3,784,316 | 1/1974 | Bittern . | |
| 4,036,560 | 7/1977 | Clark et al. . | |
| 4,148,593 | 4/1979 | Clark . | |
| 4,303,357 | 12/1981 | Makar . | |
| 5,035,548 | 7/1991 | Pidgeon | 408/703 |
| 5,108,235 | 4/1992 | Czyzewski . | |
| 5,226,762 | 2/1993 | Ecker | 408/204 |
| 5,246,317 | 9/1993 | Koetsch et al. | 408/204 |

*Primary Examiner*—Daniel W. Howell
*Attorney, Agent, or Firm*—Trexler, Bushnell, Giangiorgi & Blackstone, Ltd.

[57] ABSTRACT

A retaining collar assembly for use with a hole saw arbor assembly. The arbor assembly includes a shaft, a hole saw attached to the shaft, a drive collar retained on the shaft for engaging the hole saw and a spring retained on the shaft. The retaining collar assembly includes a retaining collar which is retained on the shaft and abuts the spring such that the spring urges the retaining collar towards the drive collar. An axial limiting area is disposed on the shaft spaced away from the collar with a retaining collar rotating area disposed therebetween. The retaining collar rotating area allows the collar to rotate about the shaft while the axial limiting area only allows axial movement and not rotary movement. Protrusions and recesses are formed on the retaining collar and drive collar to prevent rotary movement of the retaining collar and drive collar relative to one another when the retaining collar is positioned in a retaining position. The retaining collar can be disengaged from the drive collar by rotating the retaining collar an angle so that a bore extending through the retaining collar aligns with the axial limiting area allowing simultaneous axial displacement of the retaining collar and the drive collar along the shaft. When the retaining collar is axially displaced along the shaft, the drive collar is disengagable from the hole saw. When the retaining collar is urged into engagement with the drive collar, the drive collar cannot be unintentionally disengaged from the hole saw.

7 Claims, 3 Drawing Sheets

HOLE SAW ARBOR WITH RETAINING MECHANISM

BACKGROUND OF THE INVENTION

The present invention relates to arbors for use with a cup shaped or cylindrical hole saw. More specifically, the present invention pertains to a retaining mechanism for use with a hole saw arbor to prevent unintended disengagement of the arbor from the hole saw during use.

A variety of hole saw arbors are known in the art. For example, the patents listed below show hole saw arbors which receive a cup shaped or cylindrical hole saw.

| Inventor's Name | U.S. Pat. No. | Issue Date |
| --- | --- | --- |
| Czyzewski | 5,108,235 | 04/28/92 |
| Clark | 4,148,593 | 04/10/79 |
| Clark et al. | 4,036,560 | 07/19/77 |
| Bittern | 3,784,316 | 01/08/74 |
| Meshulam | 3,758,221 | 09/11/73 |

The hole saw arbor in each of these references generally includes an arbor shaft having a pilot bit attached thereto for guiding the hole saw into a workpiece. A cup shaped or cylindrical hole saw is attached to the arbor by means of a threaded end of the shaft or a retaining flange (as shown in Meshulam). A drive collar is associated with the shaft such that the collar cannot rotate about the shaft but is, rather, driven by the shaft. Pins are provided and extend from the drive collar into the hole saw to positively retain the hole saw and drive collar in engagement.

While the devices shown in the references show some kind of spring, biased bearing, or threaded nut to hold the drive collar against the hole saw, none of these devices provide a way of securely holding the drive collar in engagement with the hole saw in a quickly disengageable manner. More specifically, the Czyzewski, Clark '593, Clark et al. '560, and Bittern references show devices which have a biased bearing or spring which acts against the drive collar to hold it in engagement with the hole saw. One problem with the devices in these references is that if sufficient force is applied to the drive collar, the spring forces will be overcome thereby disengaging the drive collar from the hole saw.

The Meshulam device uses a threaded nut to engage the shaft and hold the drive collar in engagement with the hole saw. While Meshulam provides a way of holding the drive collar in engagement with the hole saw, it requires time consuming threading and unthreading of the nut. Additionally, the threaded arrangement of Meshulam can be somewhat unreliable since threads are subject to stripping and interference from, and dirt or other particulate material.

As such, it would be desirable to provide a hole saw arbor for use with a hole saw which retains the drive collar in engagement with the hole saw and prevents unintended disengagement of the drive collar from the hole saw. Additionally, it would be desirable to provide a hole saw arbor assembly which quickly and easily releases the drive collar from the hole saw to facilitate changing of the hole saw.

OBJECTS AND SUMMARY OF THE INVENTION

A general object of the present invention is to provide a hole saw arbor which prevents disengagement of a drive collar from the hole saw.

Another object of the present invention is to provide a retaining mechanism for a hole saw arbor which facilitates quick and easy engagement and disengagement of the drive collar disengaged from the hole saw.

Yet another object of the present invention is to provide a retaining mechanism to prevent accidental or unintentional drive collar retraction during use.

Briefly, and in accordance with the foregoing, the present invention envisions a retaining collar assembly for use with a hole saw arbor assembly. The arbor assembly includes a shaft, a hole saw attached to the shaft, a drive collar retained on the shaft for engaging the hole saw and a spring retained on the shaft. The retaining collar assembly includes a retaining collar which is retained on the shaft and abuts the spring such that the spring urges the retaining collar towards the drive collar. An axial limiting area is disposed on the shaft spaced away from the collar with a retaining collar rotating area disposed therebetween. The retaining collar rotating area allows the collar to rotate about the shaft while the axial limiting area only allows axial movement and not rotary movement. Protrusions and recesses are formed on the retaining collar and drive collar to prevent rotary movement of the retaining collar and drive collar relative to one another when the retaining collar is positioned in a retaining position. The retaining collar can be disengaged from the drive collar by rotating the retaining collar an angle so that a bore extending through the retaining collar aligns with the axial limiting area allowing simultaneous axial displacement of the retaining collar and the drive collar along the shaft. When the retaining collar is axially displaced along the shaft, the drive collar is disengagable from the hole saw. When the retaining collar is urged into engagement with the drive collar, the drive collar cannot be unintentionally disengaged from the hole saw.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

Figure 1:
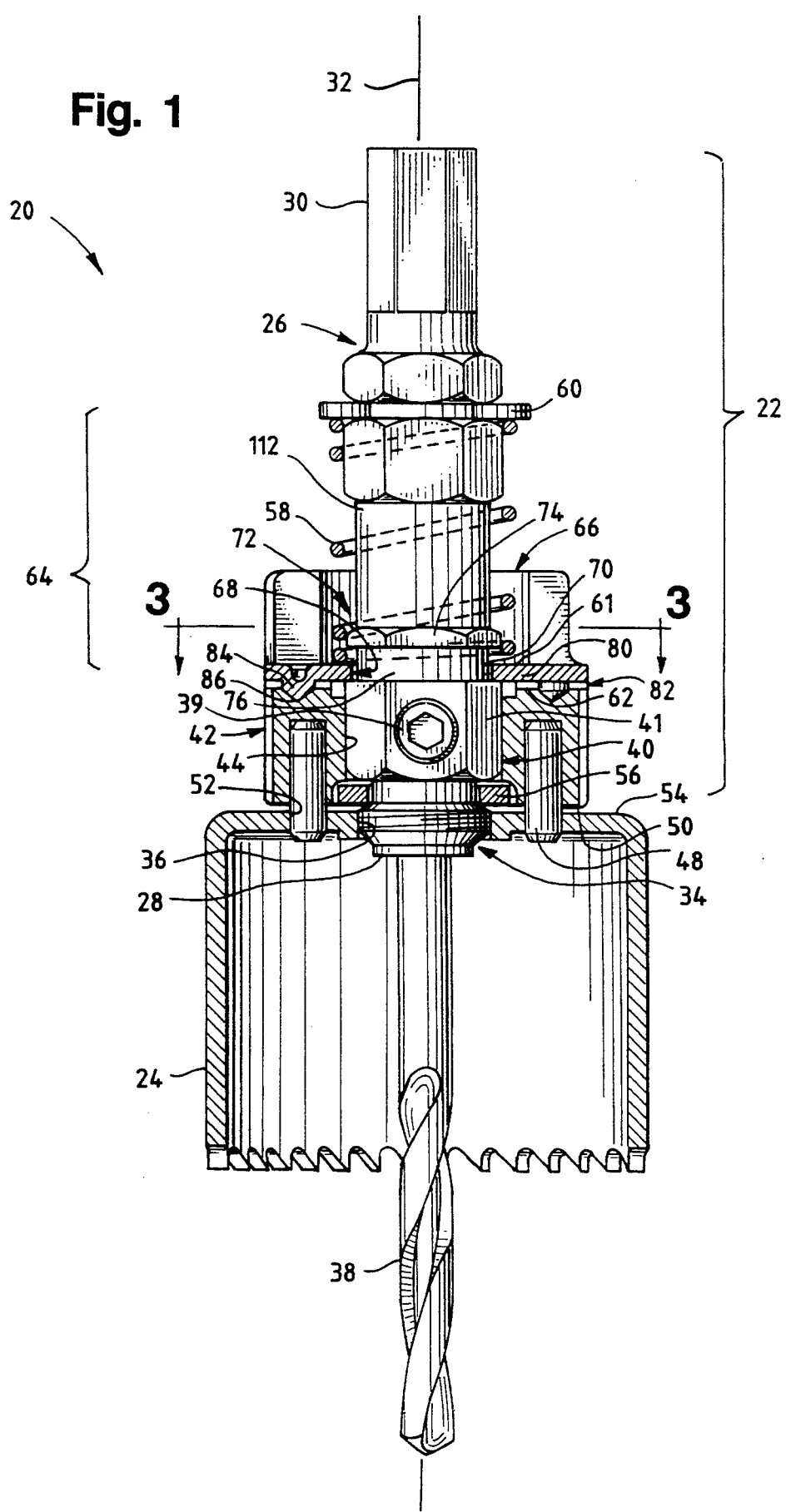
FIG. 1 is a partial fragmentary, cross-sectional, side elevational view of a hole saw arbor assembly, constructed according to the teachings of the present invention.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

An arbor assembly 20 of the present invention is shown in FIG. 1 having an arbor portion 22 with a hole saw 24 attached thereto. The arbor portion 22 includes an arbor shaft 26 which has a first end 28 and a second end 30 with a central axis 32 extending therethrough. The first end 28 includes a first saw engaging means 34 which is illustrated as a threaded coupling for engaging a cooperatively threaded bore 36 in the hole saw 24. The second end 30 is shaped to be received in a driving tool (not shown) such as a drill to rotate the arbor portion 22 and the attached hole saw 24. The second end 30 is formed with a flattened hex surface for engagement in a chuck of an appropriate rotary power tool. A pilot bit 38 extends from the first end 28 of the shaft 26 to guide the hole saw 24 into a work piece at a desired position. The pilot bit 38 is retained on the arbor shaft 26 by a lock screw 39 extending into a threaded bore 41 in the shaft 26.

Figure 2:
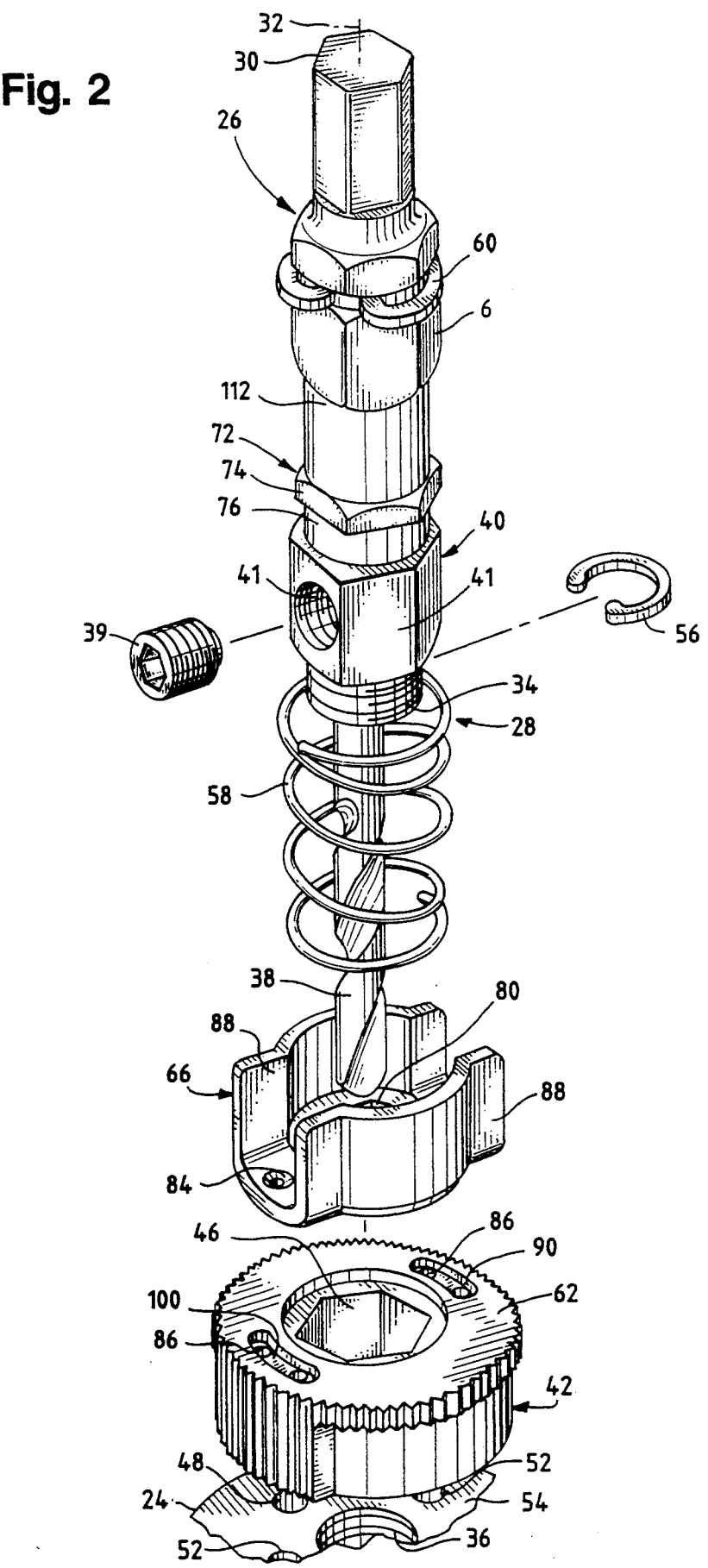
FIG. 2 is a partial fragmentary, exploded, perspective view of the arbor portion of the present invention.

The arbor portion 22 further includes a non-circular drive portion 40 formed on the arbor shaft 26 towards the first end 28. The non-circular drive portion 40 is illustrated having a polygonal outside surface 41, or more specifically, a hexagonal shaped outside surface 41. A drive collar 42 has a bore 44 formed therethrough having an inside surface 46 (see FIG. 2) having an hexagon shape for cooperatively engaging the non-circular drive portion 40. The drive collar 42 is axially displaceable along the cooperative surfaces of the drive portion and the bore 44.

A pair of extending pins 48 engage the drive collar 42 with the hole saw 24. The pins 48 are retained in the drive collar 42 and extend from a face 50 of the drive collar 42. The pins 48 cooperatively engage apertures 52 formed in a top surface 54 of the hole saw 24. It should be noted that other configurations of such saw engaging means operatively associated with the hole saw 24 and the drive collar 42 can be devised for positively engaging the drive collar 42 with the hole saw 24.

The drive collar 42 is limited in moving towards the first end 28 by a retaining ring 56 attached to the arbor shaft 26 between the non-circular drive portion 40 and the saw engaging means 34. The drive collar 42 is biased against the retaining ring 56 by a retaining collar 66 and the spring 58. A spring retaining ring 60 is attached to the arbor shaft 26 in a similar manner to the retaining ring 56 to retain the spring 58 in a slightly compressed condition such that it acts upon a top surface 61 of the retaining collar 66 that acts upon a top surface 62 of the drive collar 42 to retain the drive collar 42 against the retaining ring 56. In this position, the pins 48 are biased into engagement with the apertures 52 of the hole saw 24 retained on the first end 28 of the arbor portion 22.

With further reference to FIGS. 2–7, the arbor portion includes a drive collar retaining assembly 64. The drive collar retaining assembly 64 includes a retaining collar 66 which is associated with the shaft 26 generally between the spring 58 and the drive collar 42. A retaining collar bore 68 is formed through the retaining collar 66 with a non-circular inside surface 70.

The drive collar retaining assembly 64 further includes an axially limiting segment 72 disposed on the shaft 26 spaced a distance away from the non-circular drive portion 40 towards the second end 30 of the shaft 26. An outside surface 74 of the axial limiting segment 72 is non-circular and is cooperatively shaped to allow axial movement of the retaining collar 66 along the central axis 32 when the outside surface 74 and the inside surface 70 are in registration.

As shown in figures herein, the outside surface 74 of the limiting segment 72, the outside surface 41 of the drive portion 40, the inside surface 70 of the retaining collar bore 68, and the inside surface 46 of the drive collar bore 44 are all cooperative hexagonal shapes. It should be clear that other polygons may be used which result in a relationship wherein the retaining collar 66 and the drive collar 42 can be rotated to place the outside surfaces 74,41 and inside surfaces 70,46 in registration or out of registration. The area between the drive portion 40 and the limiting segment 72 is an annular groove 76 having a radial dimension which is less than the smallest radial dimension of the inside surface 70. As such, the retaining collar 66 is allowed to rotate about the central axis 32 when it is positioned in the annular groove 76 or retaining collar moving segment.

Engaging means 82 are provided between the retaining collar 66 and the drive collar 42. The engaging means 82 are positioned with respect to the retaining collar 66 and the drive collar 42 to maintain the retaining collar 66 so that the non-circular inside surface 70 of the bore 68 is in registration or is out of registration with the axial limiting segment 72.

More specifically, the engaging means 82 include a protrusion or dimple 84 which is engageable with a recess 86. As more clearly shown in FIG. 2, the dimples 84 are formed on radial arms 88 extending from the retaining collar 66 and the recesses 86 are formed at either end of a slot 90 formed in the top surface 62 of the drive collar 42. An engaging force or action is provided by the spring 58 against the retaining collar 66 to maintain the dimples 84 in the respective spaced-apart slots 90.

Figure 3:
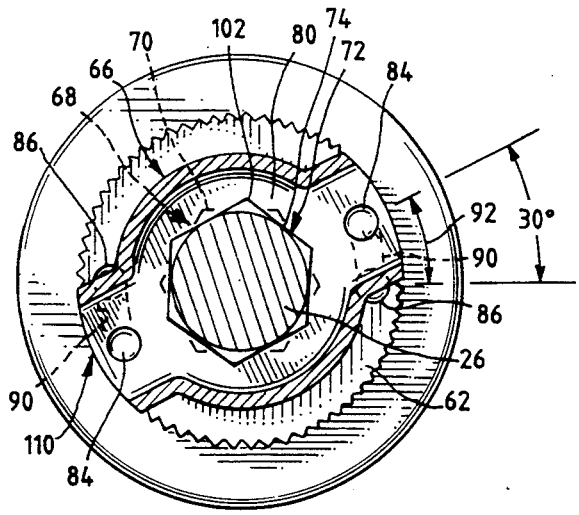
FIG. 3 is a cross-sectional, plan view taken along line 3—3 in FIG. 1 showing a bore extending through a retaining collar out of registration with a limiting portion on the shaft.

As shown in FIG. 3, the recesses 86 formed at opposed ends of the slot 90 define a separation (as indicated by angle arrow 92) of an angle of rotation of the retaining collar 66. The angle of rotation 92 is defined as the angle required to rotate the non-circular inside surface of the bore 68 of the retaining collar into and out of registration with the corresponding non-circular outside surface 74 of the axial limiting segment 72. As shown in the illustrations, the defined angle 92 is approximately 30 degrees.

Figure 4:
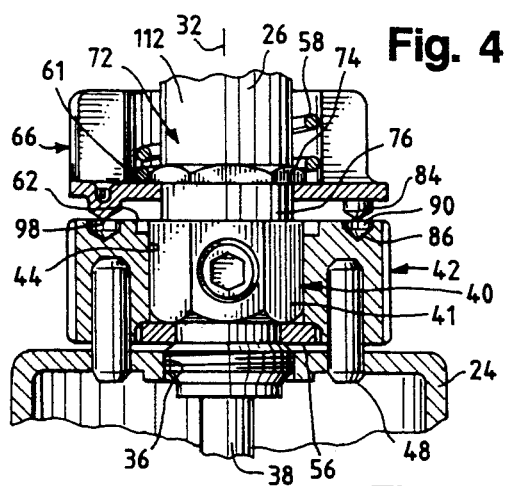
FIG. 4 is a cross-sectional side view as in FIG. 1 in which the retaining collar is rotated to place the bore extending through the retaining collar out of registration with the limiting portion.

In FIG. 4, the axial dimension or length 94 of the annular groove 76 is defined between the top surface 61 of the retaining collar 66 and a point 98 of the dimple 84.

This dimension 94 permits sufficient clearance for the retaining collar 66 to be axially displaced away from the drive collar 42 when disengaging the dimples 84 from the recesses 86 with sufficient clearance between the tip of each dimple 98 and a surface 100 of the slot 90 to allow rotation of the retaining collar 66 about the annular groove 76. In other words, when placing the non-circular surfaces 70, 74 into and out of engagement, each dimple 84 must be engaged in a corresponding one of the recesses 86. In order to move each dimple 84 from one recess 86 to the other recess 86 along the slot 90, the collar 66 must be rotated to disengage the dimple 84 from the first recess and rotated along the slot until the dimple engages the other recess.

In use, the arbor assembly 20 is assembled as shown in FIG. 1. In this configuration, the spring 58 acts to force the retaining collar 66 into engagement with the drive collar 42. The retaining collar 66 is engaged by way of the engaging means 82 such that the dimples 84 on the radial arms 88 engage corresponding, diametrically opposed recesses 86. The recesses 86 are formed at spaced apart locations in a common slot 90 with the locations being defined by an rotational angle 92. The slot 90 acts to limit the rotation of the retaining collar 66 to controllably provide either a retaining position (see, FIGS. 3 and 4) or an axial displacement position (see, FIGS. 6 and 5).

Figure 6:
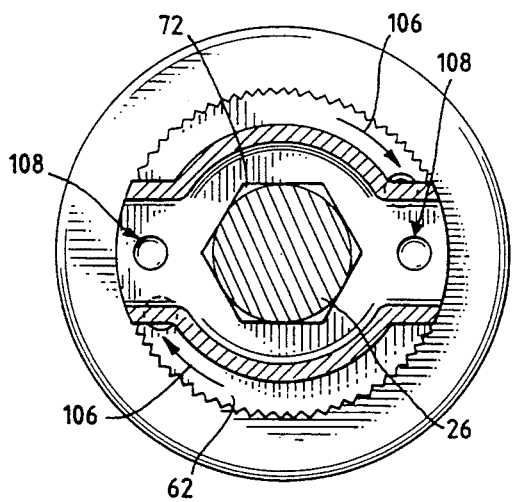
FIG. 6 is a cross-sectional, plan view taken alone line 6—6 in FIG. 5 showing the bore through the retaining collar registering with the limiting portion on the shaft of the arbor.
Figure 5:
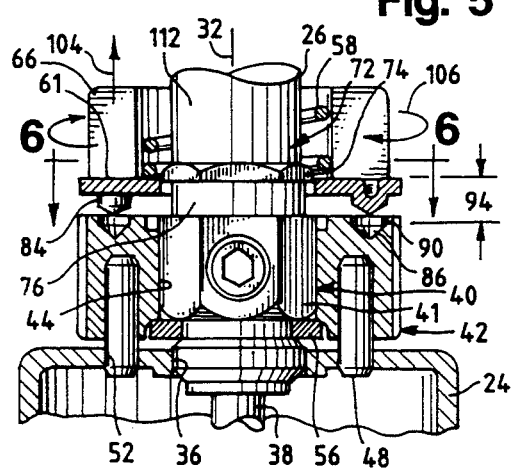
FIG. 5 is a cross-sectional side view as in FIG. 4 in which the retaining collar is rotated to place the bore in registration with the limiting portion.
Figure 7:
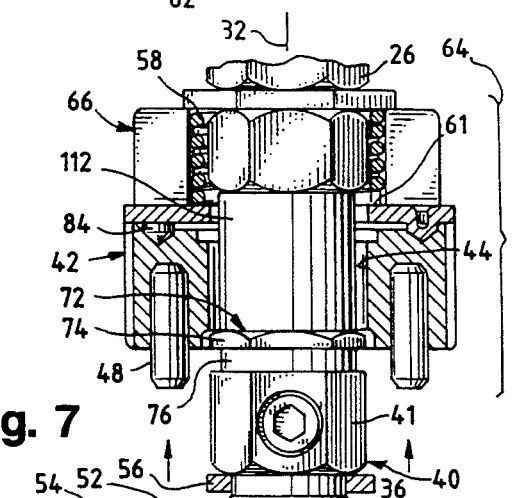
FIG. 7 is cross-sectional side elevational view similar to FIG. 1 in which the retaining collar and a drive collar have been displaced upwardly to disengage the hole saw from the arbor assembly and in which the retaining collar and the drive collar are above the limiting portion and the drive collar is positioned out of registration relative to the limiting portion to retain the drive collar out of engagement from the hole saw.
Figure 7:
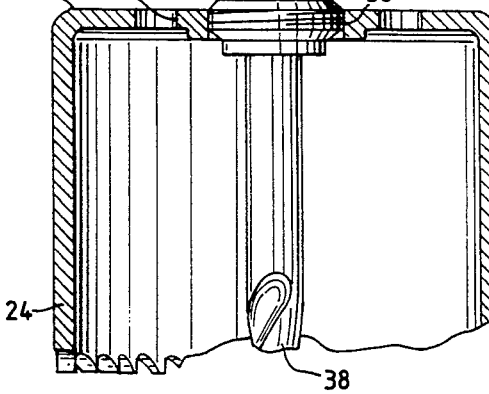

FIG. 3 shows the dimples 84 engaging corresponding recesses 86 such that the outside surface 74 of the axial limiting segment 72 is out of registration with the non-circular inside surface 70 of the retaining collar bore 68. As shown in FIG. 4, a ledge 80 engages out of registration portions 102 of the axial limiting segment 72 to prevent disengagement of the drive collar 42 from the hole saw 24. As shown in FIGS. 5 and 6, the retaining collar 66 is axially displaced (as indicated by arrow 104) and rotated (as indicated by arrow 106), a distance which is sufficient to disengage the dimples 84 from the recesses 86 to facilitate placement of the axial limiting segment 72 in registration with the retaining collar bore 68. With reference to FIG. 7, alignment of the axial limiting segment 72 with the bore 68 permits axial displacement of the retaining collar 66 and the drive collar 42 engaged therewith. The drive collar 42 is sufficiently axially displaced to disengage the pins 48 from the apertures 52 in the top surface 54 of the hole saw 24. Thus disengaged, the hole saw 24 may be removed from the first end 28 of the arbor shaft 26.

Additionally, as shown in FIG. 7, the drive collar 42 is upwardly axially displaceable so that it may be locked out of engagement from the hole saw using the limiting segment 72. The drive collar 42 in FIG. 7 has been axially displaced above the limiting segment 72 and rotated about the central axis 32 to place the inside surface 46 out of registration with respect to the outside surface 74 of the limiting segment 72. A generally circular neck 112 has a length dimension which is sufficient to allow rotation of both the drive collar 47 and the retaining collar 66 when rotating the drive collar 42 out of registration relative to the limiting segment 72. As such, the drive collar 42 is retained out of engagement from the hole saw to facilitate efficient removal or attachment of the hole saw.

In further use, when the hole saw 24 is to be attached to the arbor portion 22 the retaining collar 66 is rotated to place the dimples 84 into engagement with the corresponding recesses 86 which define an axial displacement position (see, FIGS. 6 and 5) as indicated by arrow 108 in FIGS. 6. In the axial displacement position 108, the axial limiting segment 72 is placed in registration with the bore 68. As such, the retaining collar 66 and the drive collar 42 may be axially displaced (see, FIG. 7) along the shaft to allow the hole saw 24 to be attached to the first saw engaging means 34 at the first end 28 of the shaft 26. Once the hole saw 24 is attached, the drive collar 42 is urged towards the top surface 54 of the hole saw 24 by the spring 58 for engaging the drive pins 48 with the hole saw apertures 52 (see FIG. 1).

When the pins 48 are engaged in the apertures 52, with the face 50 of the drive collar 42 in close proximity to the top surface 54 of the hole saw 24, the collar 66 is rotated in the annular groove 76 to place the dimples 84 in corresponding recesses 86 defining a retaining position as indicated generally by arrow 110 in FIG. 3. With the retaining collar 66 in the retaining position 110 the axial limiting segment 72 is placed out of registration with respect to the retaining collar bore 68 thus preventing axial displacement of the drive collar 42 from the hole saw 24.

While a preferred embodiment of the present invention is shown and described, it is envisioned that those skilled in the art may devise various modifications of the present invention without departing from the spirit and scope of the appended claims. The invention is not intended to be limited by the foregoing disclosure.

We claim:

1. A drive collar retaining assembly for use with a hole saw arbor assembly of the type having a shaft, a hole saw operatively associated with said shaft, a drive collar operatively retained on said shaft for engaging said hole saw and transferring torque from said shaft to said hole saw attached thereto, and biasing means operatively associated with said shaft and said drive collar for urging said drive collar into engagement with said hole saw, said drive collar being axially displaceable along said shaft for engaging and disengaging said hole saw; said drive collar retaining assembly comprising: a retaining collar operatively associated with said shaft between said biasing means and said drive collar; and means for selectively limiting axial movement of said drive collar along said central axis, a first non-circular surface of said limiting means formed on said shaft and a cooperatively formed second non-circular surface formed on said retaining collar, said first and second non-circular surfaces defining at least an axial displacement position and a drive collar retaining position, said axial displacement position of said limiting means being defined by said first and second non-circular surfaces being aligned for axial displacement of said retaining collar and drive collar along said central axis, said retaining position being defined by said first and second non-circular surfaces being positioned out of registration to prevent axial displacement of said retaining collar and said drive collar along said central axis, when said axial displacement position is selected said drive collar being disengagable from said hole saw, when said retaining position is selected said drive collar being retained in engagement with said hole saw.

2. A hole saw arbor assembly for preventing unintended disengagement of an arbor portion from a hole saw during use; said hole saw arbor assembly comprising: an axially elongated shaft having a central axis extending therethrough; a non-circular drive portion disposed on said shaft; means for engaging a hole saw disposed on one end of said shaft; a drive collar operatively associated with said shaft for selectively engaging said non-circular drive portion and positively engaging a hole saw attached to said engaging means of said shaft, said drive collar being selectively axially translatable along said central axis between a hole saw engaging position and a hole saw releasing position; a retaining collar being operatively associated with said shaft and said drive collar; means for biasing said drive collar being operatively associated with said shaft and said retaining collar, said biasing means urging said retaining collar towards said drive collar; and means for selectively limiting axial movement of said drive collar along said central axis, said limiting means including a first non-circular surface being disposed on said shaft and a second non-circular surface being disposed on said retaining collar, a first position of said limiting means being defined by said first and second non-circular surfaces being aligned for axial displacement of said retaining collar and drive collar along said central axis, a second position being defined by said first and second non-circular surfaces being positioned out of registration to prevent axial displacement of said retaining collar and said drive collar along said central axis, when said first position is selected said drive collar is disengagable from said hole saw, when said second position is selected said drive collar is retained in engagement with said hole saw.

3. A hole saw arbor assembly as recited in claim 2, said limiting means further comprising: engaging means disposed between said retaining collar and said drive collar, said engaging means providing selective positive engagement between said locking collar and said drive collar.

4. A hole saw arbor assembly as recited in claim 3, said engaging means further comprising: at least one recess being formed on one of said retaining collar and drive collar, and at least one protruding segment extending from the other of said retaining collar and drive collar, said protruding segment being sized and dimensioned for cooperatively engaging said recess.

5. A hole saw arbor assembly as recited in claim 2, said limiting means further comprising: two recesses formed on one of said retaining collar and drive collar, said recesses being circumferentially spaced apart an angular dimension, said angular dimension corresponding to an angle of rotation between said first position and said second position of said limiting means; and at least two protruding segments projecting from the other of said retaining collar and drive collar, said protruding segments being sized and dimensioned for cooperatively engaging one each of said at least two recesses, said protruding segments retaining said retaining collar and said drive collar in one of said first position and said second positions.

6. A hole saw arbor retaining assembly for preventing unintended disengagement of the arbor assembly from a hole saw during use; said arbor assembly comprising: an axially elongated shaft having a central axis extending therethrough; a threaded portion on one end of said shaft for engaging a cooperatively threaded portion of the hole saw; a non-circular drive portion disposed on said shaft; a drive collar operatively associated with said shaft for cooperatively engaging said non-circular drive portion and positively engaging a hole saw attached to said shaft; saw engaging means operatively associated with said hole saw and said drive collar for positively engaging said drive collar with said hole saw; a drive collar bore formed in said drive collar generally coaxial with said central axis, said shaft extending through said drive collar bore, said drive collar bore being sized and dimensioned for cooperatively engaging said non-circular drive portion for preventing rotary movement of said drive collar relative to said shaft, said drive collar being axially translatable along said central axis between a hole saw engaging position and a hole saw releasing position; a retaining collar operatively associated with said shaft and said drive collar; a retaining collar bore formed through retaining collar generally coincident with said drive collar bore, said retaining collar being axially translatable along said central axis between a drive collar engaging position and a drive collar disengaging position; means for biasing operatively associated with said shaft and said retaining collar, said biasing means urging said retaining collar towards said drive collar; and means for limiting axial movement of said drive collar along said central axis, said limiting means including cooperatively formed first and second non-circular surfaces on said shaft and said retaining collar, respectively, a first position of said limiting means being defined by said first and second non-circular surfaces being aligned for axial displacement of said retaining collar and drive collar along said central axis, a second position being defined by said first and second non-circular surfaces being positioned out of registration to prevent axial displacement of said retaining collar and said drive collar along said central axis, when said first position is selected said drive collar may be disengaged from said hole saw, when said second position is selected said drive collar is retained in engagement with said hole saw.

7. A hole saw arbor retaining assembly for preventing unintended disengagement of the arbor assembly from a hole saw during use; said arbor assembly comprising: an axially elongated shaft having a first end and a second end and a central axis extending therethrough; a non-circular drive portion disposed on said shaft; first saw engaging means disposed on said first end of said shaft for attaching said hole saw on said first end of said shaft; a drive collar cooperatively engaging said non-circular drive portion and positively engaging said hole saw; second saw engaging means disposed on said drive collar and said hole saw for positively engaging said drive collar with said hole saw, said drive collar being axially translatable along said central axis for engaging and disengaging said second saw engaging means; retaining means being operatively associated with said shaft between said first saw engaging means and said non-circular drive portion for retaining said drive collar on said shaft; a retaining collar operatively associated with said shaft and said drive collar; means for biasing operatively associated with said shaft and said retaining collar, said biasing means urging said retaining collar towards said drive collar; axial limiting means disposed on said shaft spaced away from said non-circular drive means; and a retaining collar rotating area disposed on said shaft between said axial limiting means and said non-circular drive means for allowing rotary movement of said retaining collar relative to said drive collar.

* * * * *